Patented July 31, 1934

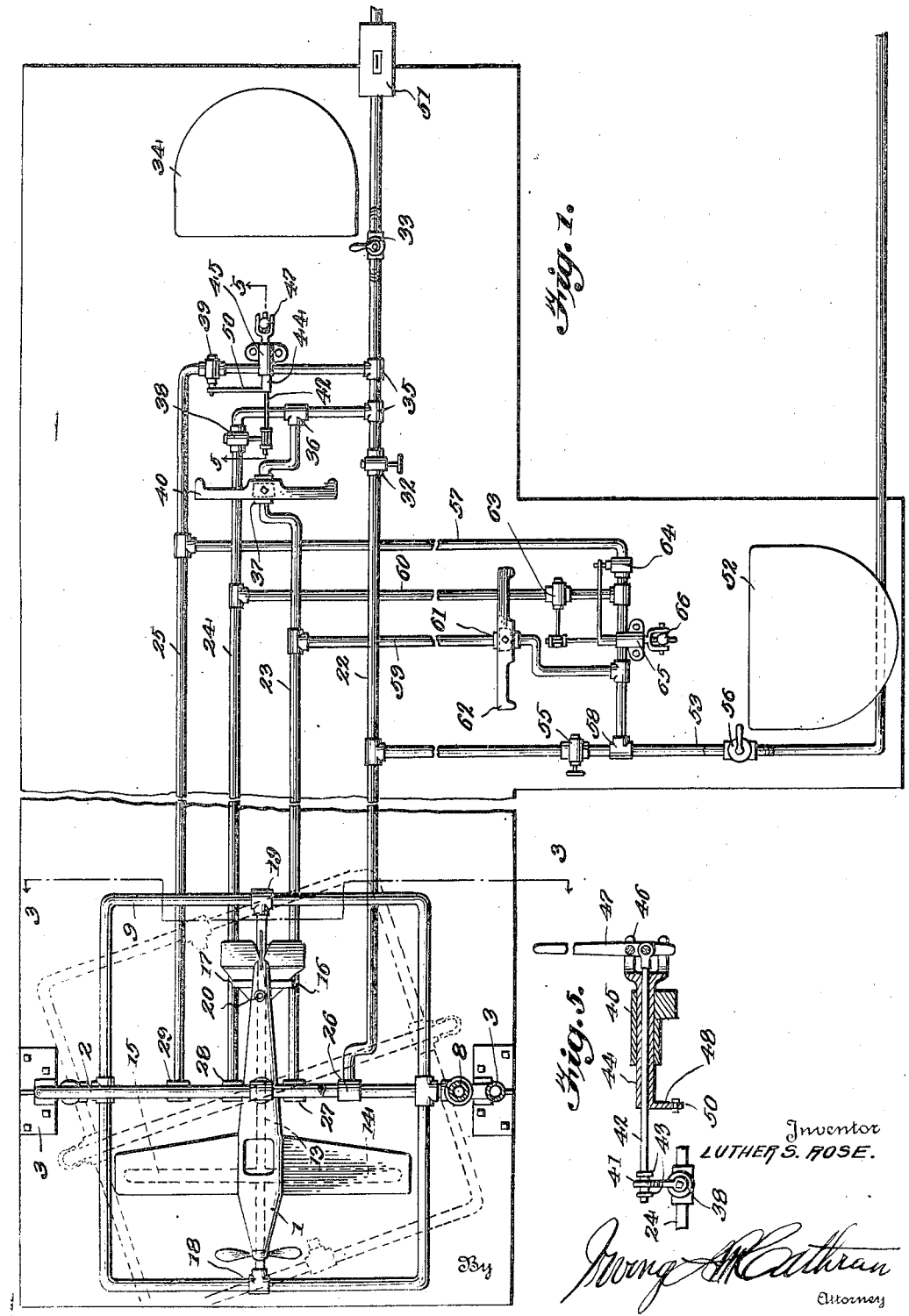

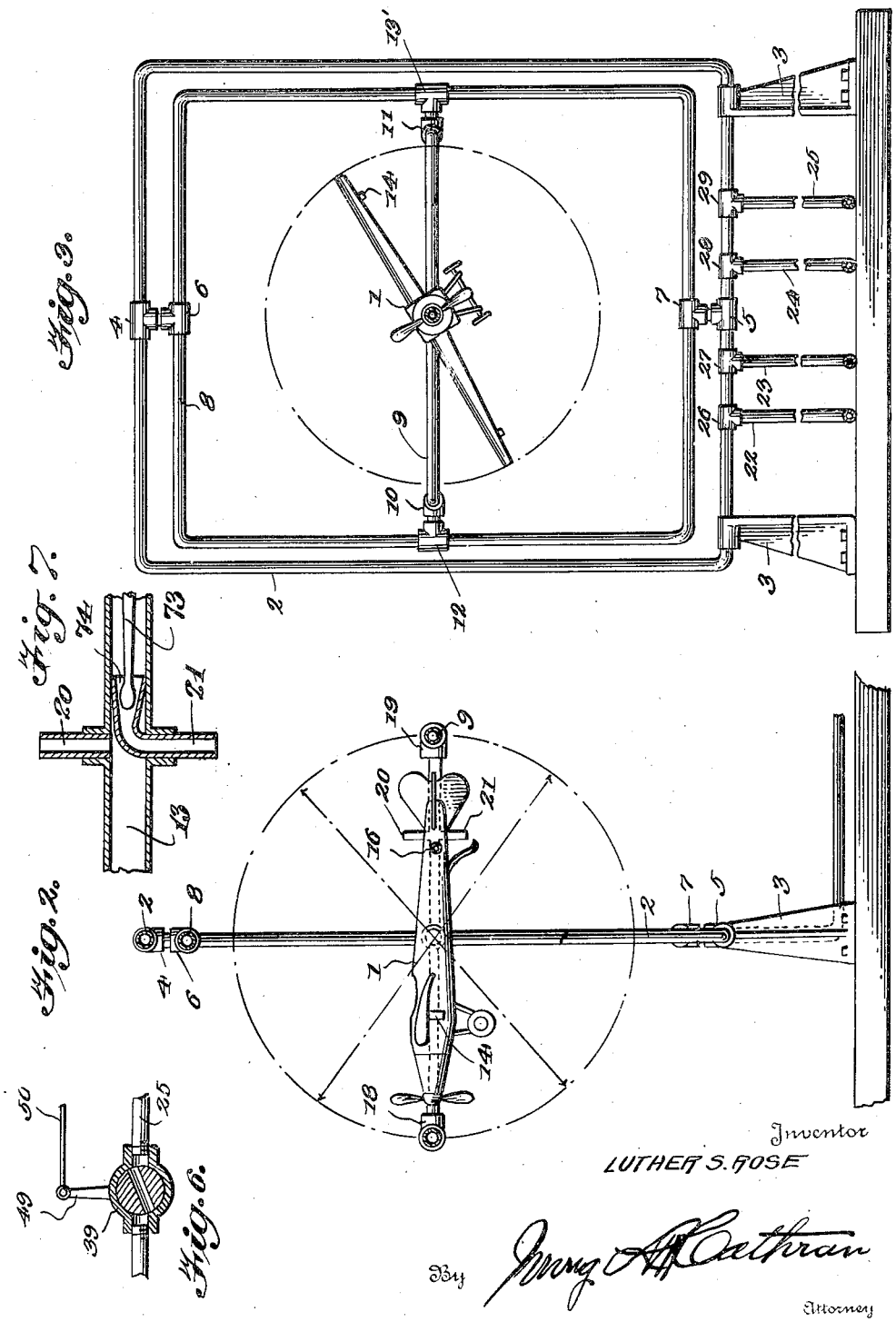

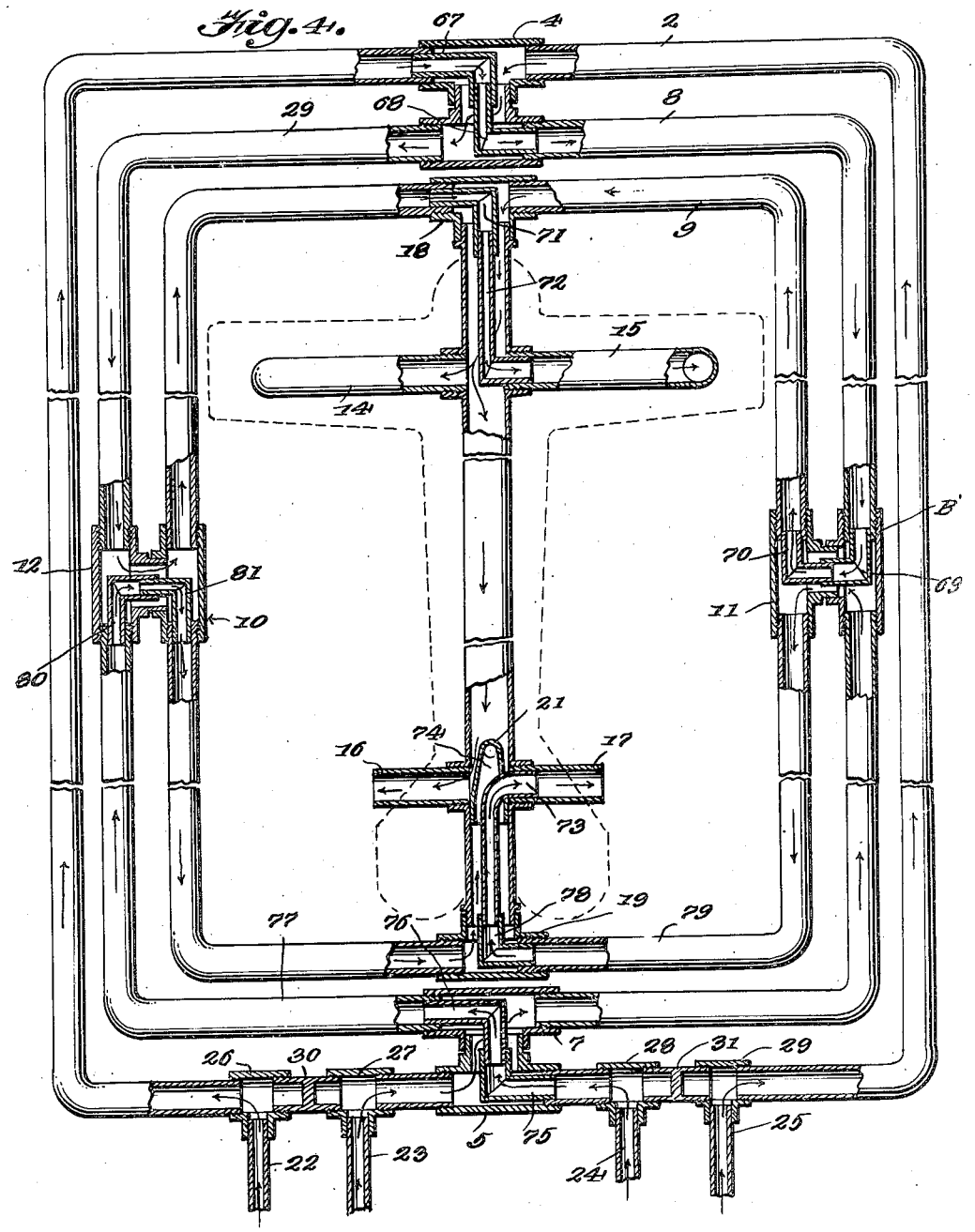

1,968,057

UNITED STATES PATENT OFFICE 1,968,057

TRAINING AND TESTING DEVICE FOR AVIATORS

Luther S. Rose, Langley Field, Va.

Application December 17, 1932, Serial No. 647,796

12 Claims. (Cl. 35—12)

This invention relates to a training and testing device for aviators, and one object of the invention is to provide a device of this character by use of which student aviators can be taught the rudiments of handling an airplane in flight without leaving the ground, and thereby eliminate accidents which often occur due to a student making a flight with an instructor and either improperly actuating the controls or becoming excited and "freezing" upon the controls.

Another object of the invention is to provide a device of this character which can be used not only as an instructing device, but also for testing in order to determine whether a pilot is qualified to handle an airplane under varying air conditions.

Another object of the invention is to provide a device which can be used either as an instructing or testing device, and also as an amusement device which may constitute a source of income for the owner and not only afford amusement and entertainment for the person operating the device, but at the same time teach the art of flying.

Another object of the invention is to provide an instructing device which is simple in construction and inexpensive to make and of such construction that it may be controlled both by a student and an instructor or tester, and thereby permit the instructor to cause the airplane to assume positions which must be corrected by the student.

Another object of the invention is to provide an instructing device controlled entirely by fluid pressure, thereby eliminating electric circuits and controls which are liable to get out of order and fail to function correctly when the device is in use.

The invention is illustrated in the accompanying drawings wherein:—

Figure 1 is a top plan view of the improved instructing device;

Figure 2 is a sectional view taken vertically through the forward portion of the device along the line 2—2 of Figure 1;

Figure 3 is a sectional view taken transversely through the device along the line 3—3 of Figure 1;

Figure 4 is an enlarged diagrammatic view of the means for mounting the airplane and controlling movements of the same;

Figure 5 is a sectional view through the control for the flippers taken along the line 5—5 of Figure 1;

Figure 6 is a sectional view through one of the valves actuated by the control illustrated in Figure 5.

Figure 7 is a fragmentary sectional view taken longitudinally through the airplane skeleton.

This improved instructing and testing device comprises briefly an airplane 1 which may be of any dimension desired, means for mounting the airplane for turning and changing movement about vertical and horizontal axes, means for supplying pressure such as air, steam, fluid, or other suitable medium to the airplane and directing the flow of the pressure through the plane to outlets opposed to each other, means for controlling the path of opposed pressure currents relative to each other in order to control the movements of the airplane, and means for rendering the device operative or inoperative, as desired. It should be noted also that there have been provided duplicate controls for the pressure, one set of controls being for use by a student, and the other by an instructor, and thereby permit the instructor or tester to impart movements to the airplane which are to be corrected by the student or pilot being instructed or tested.

In order to mount the airplane, there has been provided a frame 2 which is supported in an upright position upon standards or other suitable supports 3. This frame is formed of tubes or pipe sections and by referring to Figures 3 and 4 it will be seen that the upper ends of the frame adjoining the ends of the pipe sections are connected by a T-coupling 4, and a similar T-coupling 5 connects the joining ends of the pipe sections at the lower end of the frame. These couplings 4 and 5 are located midway between the width of the frame and have their necks rotatably engaged with the next T-couplings 6 and 7 which connect adjoining ends of the tubes or pipe sections at upper and lower ends of a ring 8 which for convenience will be referred to as an outer ring. Therefore, the outer ring 8 will be mounted for the purpose of movement about a vertical axis. An inner ring 9 which is also formed of tubes or pipe sections and is normally horizontal, extends through the outer ring 8 and at its sides has the adjoining ends of each pipe section connected by T-couplings 10 and 11 having their necks rotatably engaged with the necks of the T-couplings 12 and 13' to the next adjoining ends of pipe sections at opposite sides of the outer ring. It will thus be seen that the inner ring will be mounted for pivotal movement about the horizontal axis and will be permitted to have turning movement at right angles to the direction in which the outer ring turns about its vertical axis. The airplane is carried by the inner ring and extends longitudinally of said ring. Referring particularly to Figure 4, it will be seen that within the fuselage and wings of the airplane is mounted a skeleton consisting of a longitudinally extending tube 13 formed of sections and having side arms 14 and 15 adjacent its forward end and other side arms 16 and 17 adjacent its rear end. The front and rear ends of the tube 13 are rotatably engaged with the couplings 18 and 19 connecting adjoining ends of the pipe sections at front and rear ends of the inner ring 9, and therefore the airplane may have rolling or rotary motion about an axis extending longitudinally of the inner ring and at right angles to the axis about which the inner ring turns relative to the outer ring. By this arrangement, the airplane may be turned toward the right or left by employing turning motion to the outer ring 8, and at the same time the airplane may be tilted about its longitudinal axis for banking, or, if so desired, the airplane may be caused to execute a barrel-roll while in a horizontal position. By tilting the inner ring 9 about its horizontal axis, the airplane may be caused to assume a position for a glide, or tilted upwardly for a zoom. It will thus be seen that movements which may be imparted to an airplane when in actual flight, may be imparted to the airplane 1, and a student may be taught the proper movements necessary to control an airplane in flight and may also be taught to correct movements which have been improperly made. The ends of the arms 14 and 15 project downwardly from the wings of the airplane near the ends thereof, as shown in Figures 1 and 2 and the ends of the arms 14 and 15 project downwardly from the wings of the airplane near the ends thereof, as shown in Figures 1 and 2, and the arms 16 and 17 project outwardly from opposite sides of the rear end of the fuselage. There has also been provided upper and lower discharge arms or branch pipes 20 and 21, respectively, which lead from the tube 13 adjacent the arms 16 and 17 and project upwardly and downwardly from the airplane.

In order to supply fluid under pressure which is preferably air, but may be steam, water, or any other fluid desired, there have been provided pipes 22, 23, 24 and 25, which are connected with the lower portion of the tubular frame by couplings 26, 27, 28 and 29, and by referring to Figure 4 it will be seen that barriers 30 and 31 are located in the tubular frame between the adjoining couplings at opposite sides of the coupling 5 in order to direct flow of fluid which enters the frame from the supply pipe. The pipe 22 leads from a compressed air tank or other source of fluid under pressure, and in order to control flow of fluid through this pipe, there has been provided a regulating valve 32 and a throttle 33 which is located adjacent a seat 34 to be occupied by a student which may be referred to as a student station. The pipes 24 and 25 are joined to the pipe 22 between the valve 32 and throttle 33 by coupling 35 and the pipe 23 is connected with the pipe 24 by a coupling 36. By this arrangement the valve 32 may be opened as far as may be desired, in order to supply fluid at a constant pressure through the pipe 22 to the airplane under normal conditions, and by actuating the throttle 33, the flow of air may be controlled by a student similar to the manner in which the speed of an engine is controlled by the throttle in the cockpit of an airplane. Valves 37, 38 and 39 are located in the pipes 23, 24 and 25 in front of the student's seat 34, and the stem of the valve 37 carries an actuating bar 40 which projects from opposite sides of the pipe 23 and corresponds to the rudder bar of an airplane. Therefore a student occupying the seat 34 may place his feet against the bar 40 and by pressing upon this bar, open or close the valve 37. It will thus be seen that adjustment of the valve 37 will be carried out as in the manner in which the rudder of an airplane is controlled and moved either toward the right or left. The stem of the valve 38 carries an upstanding arm 41 having an eye at its upper end to receive one end portion of a rod 42 upon which are mounted abutments 43 disposed at opposite sides of the arm 41 and causing the valve 38 to be opened or closed by shifting the rod 42 longitudinally in a determined direction. This rod is slidably received in the sleeve 44 rotatably mounted in a bearing 45, fixed to a suitable support in front of the student's seat, and at its rear end the sleeve carries forks 46 between which a lever or tiller 47 corresponding to the tiller of an airplane. The student grasps the lever near its upper end and by rocking the tiller forwardly or rearwardly reciprocating motion may be imparted to the rod 42 to open or close the valve 38. By rocking the lever tranversely the student may impart rotary motion to the sleeve 44 and since this sleeve has an arm 48 at its forward end connected with the handle 49 of the valve 39 by a rod or link 50 the valve 39 may be opened or closed according to the direction in which the sleeve is turned. Therefore the student may move the lever forwardly and rearwardly in the same manner in which an airplane tiller is moved to actuate the motion of an airplane and may also move the tiller toward the right or left in the same manner in which an airplane tiller is moved to control the ailerons.

If the device is to be used as an amusement device or for individual instruction by a student without the aid of an instructor, only a single seat and one set of controls may be provided, and if so desired a coin-controlled device which may be of any suitable construction and as indicated by the numeral 51, may be placed in the pipe 22 back of the student's seat in order to prevent the device from operating unless a coin is inserted. This coin-controlled device has not been illustrated in detail, since any device of this character may be used which will permit the flow of air through the pipe 22 from the source of supply after the coin has been inserted, and then cause the flow of fluid to be shut off at a predetermined time.

In order to accommodate an instructor or tester there has been provided a second seat 52 which may be referred to as the instructor's station. Adjacent this seat extends a pipe 53 which is connected with the pipe 22 by a coupling 54 and carries a regulating valve 55 and throttle valve 56 carried by each of the valves 32 and 33, whereby the instructor by properly manipulating the throttle valve 56 may permit more or less than the normal flow of fluid to the airplane and the student may adjust the throttle 33 in order to overcome this and correct the pressure. The pipe 57 leads from the pipe 25 to the pipe 53 to which it is connected by a coupling 58 between the valves 55 and 56 and other pipes 59 and 60 lead from the pipes 23 and 24 and are jointed to the pipe 57. The pipe 59 is provided with a valve 61 corresponding with the valve 40 and controlled by a rudder bar 62 and in the pipes 60 and 57 are located valves 63 and 64 corresponding to the valves 38 and 39 and controlled by the mechanism indicated in general by the numeral 65 and corresponding to the mechanism by means of which the valves 38 and 39 are adjusted. It will thus be seen that the instructor occupying the seat 52 may place his feet against the rudder bar 62 and by grasping a lever or tiller 66 of the control means 65, open or close the valves in order to impart movement to the airplane which must be corrected by the student. It will thus be seen that the instructor may impart such motion to the airplane which would be liable to be caused by unexpected air currents encountered when an airplane is in flight and may also cause the airplane to go into a slide-slip or dive which may occur when an airplane is improperly controlled by an inexperienced aviator.

Air, steam, liquid, or other similar medium for producing pressure which is supplied under constant pressure through the pipe 22 enters the lower portion of the frame 2 and since the barrier 30 is located between the couplings 26 and 27 this air will be directed toward a side of the frame, as indicated by the arrows in Figure 4. This pressure passes upwardly to the upper end of the frame and upon reaching the coupling 4 it passes through a nipple 67. This nipple 67 extends through the neck of the coupling 4 and is rotatably engaged with a corresponding end portion of a nipple 68 mounted in the coupling 6, and therefore the air will be directed toward one side of the ring 8. The pressure flows downwardly through one side portion of the ring 8 until it reaches the coupling 13' and then passes through the companion nipples 69 and 70 carried by the couplings 13' and 11 into the inner ring. It will thus be seen that the flow of pressure from the frame 2 into the outer ring 8 and from the outer ring to the inner ring may be controlled without interference with the turning movement of the inner and outer rings. Upon reaching the forward end portion of the inner ring, the pressure passes into the tube 13 about a nipple 71 and since the nipple 71 is rotatably engaged with one end of a companion nipple 72 leading from the inner end portion of the side arm 15 pressure will be permitted to enter the unobstructed side arm 14 without entering the arm 15. This pressure also passes through the tube 13 toward its rear end and passes out through the side arm 16 and upper branch pipe 20 leading directly from the tube 13 as shown in Figure 7 without passing through the side arm 17 and lower branch pipe 21 as the branch pipe 17, is blocked by a nipple 73 and the pipe 21 communicates with a nipple 74 blocking the tube as shown in Figure 4. It will thus be seen that the flow of pressure from the constant pressure pipe 22 to the side arms 14 and 15 and upper branch pipe 20 will be controlled only by means of a thottle valve actuated either by the student or by the instructor.

Liquid, air, steam or other medium under pressure which enters the frame through the pipe 23 is directed toward the coupling 5 by the barrier 30 and passes through necks of the couplings 5 and 7 about the rotatably engaged nipples 75 and 76. The nipple 75 prevents pressure going through the pipe 23 from moving the coupling 5 toward the coupling 28 and the nipple 76 which fits tightly into the pipe section 77 of the outer ring causes the flow to be directed toward the opposite side of the outer ring. Therefore the air or other medium under pressure will move toward the desired side of the outer ring and flow upwardly until it reaches the coupling 13 through which it will pass about the nipples 69 and 70 and then toward the rear end of the inner ring until it reaches the coupling 19. A nipple 78 which is rotatably engaged with the rear end of the nipple 73 fits tightly into the end of the pipe section 79 of the inner ring engaged by the nipple 19 and therefore this medium under pressure will flow through the nipples 78 and 73 and enter the side arm 17. The side arms 16 and 17 project horizontally from opposite sides of the rear portion of the airplane and if the pressure flowing through both of these side arms is equal, the airplane will be caused to assume a position in which straightaway flight will take place. By pressing upon the rudder bar, with one foot or the other, the valve 37 may be partially shut off or opened to a greater extent, thereby varying the flow of the medium under pressure through the side arm 17. If the flow through this side arm is reduced, the pressure passing from the side arm 16 will cause the airplane to turn toward the left, whereas if the flow is increased beyond that of the pressure passing through the side arm 16, the air plane will be caused to turn toward the right. Therefore the student may drive the airplane either toward the right or left. The instructor or tester may also impart similar movement by actuating his rudder bar 62 and cause the airplane to make moves which must be corrected by the student.

When a turn is made. the ailerons must be moved in order to bank the plane, and when flying straightaway the ailerons must ordinarily be kept substantially horizontal while at other times they must be moved in order to prevent an airplane from going into a side-slip. Banking of the airplane and keeping it upon an even keel is controlled by pressure passing through the side arm 15. The pressure which passes through the arm 15 enters the frame 2 through the pipe 25 and is directed toward the adjacent side of the frame by the barrier 31. This pressure passes upwardly through the frame and across the top thereof until it reaches the coupling 4 and passes through this coupling and the coupling 6 about the nipples 67 and 68. Upon entering the outer ring 8, the pressure is directed into the pipe section 79 of the outer ring by the nipple 68 which blocks movement of this pressure in an opposite direction, and the pressure flows to the coupling 12 through which it passes about nipples 80 and 81 carried by the outer ring and inner ring as they contact with each other. Upon entering the inner ring the pressure moves forwardly until it reaches the coupling 18 and then passes through the nipples 71 and 72 into the side arm 15. Force created by the medium under pressure passing through the side arms 14 and 16 oppose each other and if the forces are equal, the airplane will be retained upon an even keel. If the tiller is moved in a direction to close the valve 39, and thereby reduce the flow of pressure through the side arm 15, the pressure passing through the side arm 14 will cause the airplane to be banked toward the right, whereas if the valve 39 is moved in an opening direction to increase the flow, the pressure passing through the side arm 15 will exceed that passing through the side arm 14 and the airplane will be banked toward the left. By properly manipulating the tiller, it is therefore possible to bank the airplane in a desired direction when a turn is to be made and restored to an even keel.

Adjustment of the airplane to tilt it for a glide or zoom is effected by rocking the tiller forwardly or rearwardly in order to adjust the valve 38 and control the flow of the medium under pressure through the pipe 24. This air enters the lower bar of the frame through the coupling 28 and moves through the nipples 75 and 76 into the pipe section 77 of the outer ring 8. The medium under pressure passes through this pipe section and up over the side portion of the outer ring to the coupling 12 and passes through the nipple 80 and 81 into the inner ring. The medium under pressure then flows rearwardly and across the rear end of the inner ring to the coupling 19 through which it passes about the nipples 78 and 73 into the rear end of the tube 13 and after moving forwardly enters the nipples 74 through which it passes to the discharge pipe 21 passing downwardly through the airplane. Since the pressure passing outwardly through the pipe 21 equals the pressure passing through the pipe 20, the airplane will be retained upon an even keel and prevented from tilting upwardly and downwardly. When this pressure is reduced below that passing outwardly through the pipe 20, the airplane will be carried up for a zoom or loop and if the pressure is increased beyond that passing through the pipe 20, the airplane will be nosed over for a glide.

A student may therefore control movement of the airplane 1 in the same manner in which an airplane is operated, and may cause it to execute any movement desired. At the same time an instructor or tester may impart movement to the plane which might be caused by unexpected air currents or improper handling of the plane by an aviator, and the student must correct the movement. I therefore have provided an instructing device which will be very effective in teaching the art of handling an airplane and will be simple in construction. I have further provided a device of this character in which electric circuits and other complicated mechanism are eliminated and may therefore be manufactured at a low cost.

Having described the invention, what is claimed as new is:—

1. In an instructing device for pilots, a vehicle mounted for pivotal movement, means for conducting a medium under pressure through said vehicle having companion outlets for discharging the medium from opposed portions of the vehicle, and means for varying pressure of the medium discharged from certain of the outlets relative to their companion outlets and controlling movements of the vehicle.

2. In an instructing device for pilots, a vehicle mounted for universal pivotal movement, conduits for conducting a medium under pressure through the vehicle and discharging the medium from opposed portions thereof, certain of said conduits discharging a medium at a constant pressure, and means for controlling the force of the medium under pressure discharged through other conduits relative to the constant pressure medium and regulating movements of the vehicle.

3. In an instructing device for pilots, a vehicle mounted for pivotal movement and having a skeleton formed of tubing and constituting companion conduits discharging through opposed portions of the vehicle, means for supplying fluid under constant pressure to certain of said conduits, and means for supplying fluid under pressure to conduits companion to the constant pressure conduits and regulating pressure whereby movements of the vehicle may be controlled.

4. In an instructing device for pilots, a vehicle mounted for pivotal movement and having a skeleton formed of tubing and constituting companion conduits discharging through opposed portions of the airplane, means for supplying fluid under constant pressure to certain of said conduits, means for supplying fluid under pressure to said conduits companion to the constant pressure conduits, means for regulating pressure of fluid passing through the last mentioned conduits to be operated by a student for controlling movements of the vehicle, and other means for regulating the pressure, to be operated by an instructor.

5. In an instructing device for pilots, a vehicle mounted for pivotal movement and having a skeleton formed of tubing and constituting companion conduits discharging through opposed portions of the vehicle, means for supplying fluid under constant pressure to certain of said conduits, means for supplying fluid pressure to conduits companion to the constant pressure conduits, means to be operated by a student for regulating flow of fluid through the last mentioned conduits and controlling movements of the vehicle, and other means for regulating the flow of fluid beyond the reach of a student.

6. In an instructing device for aviators, a frame, inner and outer rings mounted in said frame for pivotal movement at right angles to each other, a skeleton for an airplane in the inner ring mounted for pivotal movement at right angles to movement of the inner ring, the frame, rings and skeleton consisting of interconnected tubes forming conduits for fluid under pressure and having companion outlets opening through opposed portions of an airplane, means being provided for directing flow of fluid through said conduits with the fluid passing from certain of the outlets at a constant pressure, and means for regulating pressure of fluid discharged from the remaining outlets relative to their companion constant pressure outlets and controlling movements of the airplane and rings.

7. In an instructing device for aviators, a vertical frame formed of tubing, inner and outer rings formed of tubing and an airplane skeleton formed of tubing, said outer ring being disposed vertically and having necks at its upper and lower ends rotatably connected with the frame and opening into the frame and outer ring, said inner ring normally extending horizontally through the outer ring and having necks at its sides rotatably connected with the sides of the outer ring and opening into the inner and outer rings, said skeleton extending longitudinally in the inner ring and having its ends rotatably engaged with the ends of the inner ring and opening into the same, the skeleton having opposed side outlets near its front and rear ends and upper and lower outlets near its rear end, means for directing fluid under pressure through the frame, rings and skeleton to the outlets, and means for varying force of fluid flowing to certain of the outlets.

8. In an instructing device for aviators, a vertical frame formed of tubing, inner and outer rings formed of tubing and an airplane skeleton formed of tubing, said outer ring being disposed vertically and having necks at its upper and lower ends rotatably connected with the frame and opening into the frame and outer ring, said inner ring normally extending horizontally through the outer ring and having necks at its sides rotatably connected with sides of the outer ring and opening into the inner and outer rings, said skeleton extending longitudinally in the inner ring and having its ends rotatably engaged with the ends of the inner ring and opening into the same, the skeleton having opposed side outlets near its front and rear ends and upper and lower outlets near its rear end, means for delivering fluid under pressure into the tubular frame consisting of pipes connected to one end of the frame at opposite sides of the rotary connection between the frame and outer ring, means for directing the flow of fluid through the frame, rings and skeleton to the outlets, a valve in one delivery pipe which when opened admits air under constant pressure to certain of said outlets, valves in the other delivery pipes, and means for adjusting the last mentioned valves to vary the pressure of air flowing to outlets in opposed relation to the last mentioned outlets.

9. In an instructing device for aviators, a vertical frame formed of tubing, inner and outer rings formed of tubing and an airplane skeleton formed of tubing, said outer ring being disposed vertically and having necks at its upper and lower ends rotatably connected with the frame and opening into the frame and outer ring, said inner ring normally extending horizontally through the outer ring and having necks at its sides rotatably connected with sides of the outer ring and opening into the inner and outer rings, said skeleton extending longitudinally in the inner ring and having its ends rotatably engaged with the ends of the inner ring and opening into the same, the skeleton having opposed side outlets near its front and rear ends and upper and lower outlets near its rear end, means for delivering fluid under pressure into the tubular frame consisting of pipes connected to one end of the frame at opposite sides of the rotary connection between the frame and outer ring, barriers in the tubing of the main frame between delivery pipes, nipples in the rotary connections of the frame, rings and skeleton for directing flow of fluid towards opposed outlets, means for causing flow of air under constant pressure from one delivery pipe to certain of the outlets, valves in the remaining delivery pipes, and means for actuating said valves to vary the pressure of fluid flowing to outlets opposed to the constant pressure outlets.

10. In an instructing device for aviators, a vertical frame formed of tubing, inner and outer rings formed of tubing and an airplane skeleton formed of tubing, said outer ring being disposed vertically and having necks at its upper and lower ends rotatably connected with the frame and opening into the frame and outer ring, said inner ring normally extending horizontally through the outer ring and having necks at its sides rotatably connected with the sides of the outer ring and opening into the inner and outer rings, said skeleton extending longitudinally in the inner ring and having its ends rotatably engaged with the ends of the inner ring and opening into the same, the skeleton having opposed side outlets near its front and rear ends and upper and lower outlets near its rear end, means for delivering fluid under pressure into the tubular frame consisting of pipes connected to one end of the frame at opposite sides of the rotary connection between the frame and outer ring, barriers in the tubing of the main frame between delivery pipes, nipples in the rotary connections of the frame, ring and skeleton for directing flow of fluid towards opposed outlets, means for causing flow of air under constant pressure from one delivery pipe to certain of the outlets, valves in other delivery pipes each having a radially extending handle and disposed at right angles to each other, a bearing, a sleeve rotatable in said bearing and having an arm, a link connecting the arm and one valve handle, a lever pivoted to the sleeve, and a rod extending through the sleeve and connecting the lever and other valve handle.

11. In an instructing device for pilots, a vehicle mounted for turning movements, means for discharging a medium under constant pressure from a portion of the vehicle, means for discharging a portion of the medium under pressure from an opposite portion of the vehicle, and means for controlling pressure of the last mentioned portion of the medium relative to the first mentioned portion thereof and thereby controlling movements of the vehicle.

12. In an instructing device for pilots, an object mounted for turning movements, means for discharging a medium under constant pressure from a portion of the object, means for discharging a portion of the medium under pressure from an opposite portion of the object, and means for controlling pressure of the last mentioned portion of the medium relative to the first mentioned portion thereof and thereby controlling movements of the object.

LUTHER S. ROSE.